(12) United States Patent
Fandrei, II

(10) Patent No.: US 10,781,722 B2
(45) Date of Patent: Sep. 22, 2020

(54) STEAM TURBINE, A STEAM TURBINE NOZZLE, AND A METHOD OF MANAGING MOISTURE IN A STEAM TURBINE

(71) Applicant: GENERAL ELECTRIC COMPANY, Schenectady, NY (US)

(72) Inventor: Theodore William Fandrei, II, Latham, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 965 days.

(21) Appl. No.: 14/966,466

(22) Filed: Dec. 11, 2015

(65) Prior Publication Data

US 2017/0167301 A1    Jun. 15, 2017

(51) Int. Cl.
*F01D 25/32* (2006.01)
*B23K 26/0622* (2014.01)
(Continued)

(52) U.S. Cl.
CPC .......... *F01D 25/32* (2013.01); *B23K 26/0006* (2013.01); *B23K 26/0624* (2015.10);
(Continued)

(58) Field of Classification Search
CPC ........... F01D 25/32; F01D 5/286; F01D 9/041
See application file for complete search history.

(56) References Cited

U.S. PATENT DOCUMENTS 6,004,102 A * 12/1999 Kuefner .................. F01D 5/286
416/196 R 8,132,414 B2 * 3/2012 Niizeki .................. F01D 5/284
416/241 A
(Continued)

FOREIGN PATENT DOCUMENTS

DE    195 46 008 A1    6/1997
EP    2 390 467 A1    11/2011
(Continued)

OTHER PUBLICATIONS

Extended European Search Report and Opinion issued in connection with corresponding EP Application No. 16202996.1 dated Jul. 6, 2017.

*Primary Examiner* — J. Todd Newton
*Assistant Examiner* — Sabbir Hasan
(74) *Attorney, Agent, or Firm* — McNees Wallace & Nurick LLC

(57) ABSTRACT

A hydrophilic surface pattern on a removal surface of a steam turbine directs surface moisture in at least one predetermined direction to enhance moisture management by enhancing moisture removal or otherwise reducing erosion caused by moisture in the steam turbine. In some embodiments, the removal surface is located on the outer surface of the nozzle wall adjacent an extraction opening. In some embodiments, the removal surface is located on the surface of the bucket and directs moisture toward the turbine rotor. In some embodiments, the removal surface is located on the surface of the turbine casing or the surface of the nozzle and directs moisture toward a drain in the turbine casing. The hydrophilic surface pattern is preferably laser-etched as a nano-scale pattern to create the hydrophilic surface. In some embodiments, the hydrophilic surface pattern creates a superhydrophilic surface.

15 Claims, 5 Drawing Sheets

(51) Int. Cl.
  *B23K 26/352* (2014.01)
  *B23K 26/00* (2014.01)
  *B23K 26/60* (2014.01)
  *B23K 26/40* (2014.01)
  *B23K 26/361* (2014.01)
  *F01D 5/28* (2006.01)
  *F01D 9/04* (2006.01)
  *B23K 101/00* (2006.01)

(52) U.S. Cl.
  CPC ........ *B23K 26/352* (2015.10); *B23K 26/3568* (2018.08); *B23K 26/361* (2015.10); *B23K 26/40* (2013.01); *B23K 26/60* (2015.10); *F01D 5/286* (2013.01); *F01D 9/041* (2013.01); *B23K 2101/001* (2018.08); *F05D 2220/31* (2013.01); *F05D 2230/10* (2013.01); *F05D 2230/13* (2013.01); *F05D 2240/121* (2013.01); *F05D 2240/123* (2013.01); *F05D 2260/602* (2013.01); *F05D 2300/51* (2013.01); *F05D 2300/514* (2013.01); *F05D 2300/516* (2013.01); *F05D 2300/612* (2013.01); *F05D 2300/613* (2013.01); *F05D 2300/614* (2013.01); *Y02T 50/673* (2013.01)

(56) References Cited

U.S. PATENT DOCUMENTS

| 8,998,571 | B2 | 4/2015 | Burdgick et al. |
| 2005/0056313 | A1 | 3/2005 | Hagen et al. |
| 2012/0328905 | A1* | 12/2012 | Guo ............ C21D 8/0294 428/687 |
| 2013/0306154 | A1 | 11/2013 | Moliere et al. |
| 2015/0118166 | A1 | 4/2015 | Sagel et al. |

FOREIGN PATENT DOCUMENTS

| EP | 2 574 729 | A2 | 4/2013 |
| EP | 3 040 363 | A1 | 7/2016 |
| JP | 2007-309235 | A | 11/2007 |
| JP | 2007309235 | A * | 11/2007 |
| JP | 2009-191733 | A | 8/2009 |
| JP | 5112103 | B2 * | 1/2013 |
| JP | 2013-234599 | A | 11/2013 |
| SU | 615240 | A1 | 7/1978 |
| SU | 1507991 | A1 | 9/1989 |
| WO | 2004/035187 | A2 | 4/2004 |
| WO | 2013/087073 | A2 | 6/2013 |
| WO | 2015/029444 | A1 | 3/2015 |
| WO | 2015/065968 | A1 | 5/2015 |

\* cited by examiner

STEAM TURBINE, A STEAM TURBINE NOZZLE, AND A METHOD OF MANAGING MOISTURE IN A STEAM TURBINE

FIELD OF THE INVENTION

The present invention is directed to steam turbines. More particularly, the present invention is directed to a steam turbine having a hydrophilic surface pattern for enhanced moisture management.

BACKGROUND OF THE INVENTION

Steam turbines extract work from a flow of steam to generate power by converting the energy of high-temperature, high-pressure steam generated by a boiler into rotational energy by supplying the steam to cascades of stationary blades (nozzles) and moving blades (buckets). A typical steam turbine may include a rotor associated with a number of wheels. The wheels may be spaced apart from each other along the length of the rotor to define a series of turbine stages. The turbine stages are designed to extract useful work from the steam traveling on a flow path from an entrance to an exit of the turbine in an efficient manner. As the steam travels along the flow path, the steam causes the wheels to drive the rotor. The steam gradually may expand and the temperature and pressure of the steam gradually may decrease. The steam then may be exhausted from the exit of the turbine for reuse or otherwise. Higher temperature steam turbines may generate increased output as the increased temperature of the steam increases the overall energy available for extraction.

Generally described, a typical steam turbine may include a high pressure section, an intermediate pressure section, and a low pressure section. The sections may be arranged in series with each section including any number of stages. Within the sections, work is extracted from the steam to drive the rotor. Between the sections, the steam may be reheated for performing work in the next section. The high pressure and the intermediate pressure sections may operate at relatively high temperatures so as to increase the overall steam turbine output.

As the pressure and temperature change, the steam becomes wet. As the steam flows through the turbine stages of buckets and nozzles, moisture contained in the steam condenses into fine water droplets on turbine surfaces, including the nozzles. These fine water droplets combine into coarse water droplets, which are scattered by the steam flow and collide with the buckets downstream of the nozzles. The collisions damp the torque of the buckets through high speed impacts and thus decrease the total performance of the turbine. The coarse water droplets may also cause erosion of surfaces of the buckets, which decreases the aerodynamic performance and section thickness of the buckets and thus shortens their useful lifespan.

Moisture contained in the steam is mainly deposited on concave surfaces of the nozzles in the form of films of water. The water films build across the surface of the nozzles and flow to the trailing edges while increasing in thickness. The water films are released from the trailing edges of the nozzles as water droplets. If the water films are thick, large and coarse water droplets are released.

In a steam turbine, late stage moisture in the form of water droplets may create significant erosion in last stage turbine blades. As the size of the water droplets increases, the amount of erosion caused by the water droplets increases, so removing moisture or otherwise preventing the formation of coarse water droplets may be effective to decrease erosion. Conventionally, controls have involved protection methods, such as installing cobalt-chromium alloy (such as those marketed under the trademark Stellite by Kennametal Inc., Latrobe, Pa.) erosion shields in late stage blades, using slinger grooves in buckets, flame hardening the leading edge of the buckets, selecting alloys with improved water droplet erosion characteristics, or improving extraction through the casing. Extraction through slits or holes in the upstream diaphragm nozzles has also been used to remove moisture. Other methods of moisture removal include heating the steam flow locally or heating the nozzles.

BRIEF DESCRIPTION OF THE INVENTION

In an exemplary embodiment, a steam turbine includes a turbine casing, a turbine rotor disposed in the turbine casing, at least one bucket extending from the turbine rotor, and at least one nozzle supported by the turbine casing. At least one hydrophilic surface pattern on a removal surface of at least one of the turbine casing, the bucket, and the nozzle directs moisture on the removal surface in a predetermined direction to enhance moisture removal in the steam turbine.

In another exemplary embodiment, a steam turbine nozzle includes a nozzle wall having an inner surface, an outer surface, at least one extraction opening through the nozzle wall from the outer surface to the inner surface, and a hydrophilic surface pattern on the outer surface of the nozzle wall adjacent the extraction opening.

In another exemplary embodiment, a method of forming a steam turbine for enhanced moisture removal includes laser etching at least one hydrophilic surface pattern on a removal surface of at least one of a turbine casing, at least one bucket, and at least one nozzle of the steam turbine to direct moisture on the removal surface in a predetermined direction to enhance moisture removal in the steam turbine. The steam turbine includes the turbine casing, a turbine rotor disposed in the turbine casing, the bucket extending from the turbine rotor, and the nozzle supported by the turbine casing.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
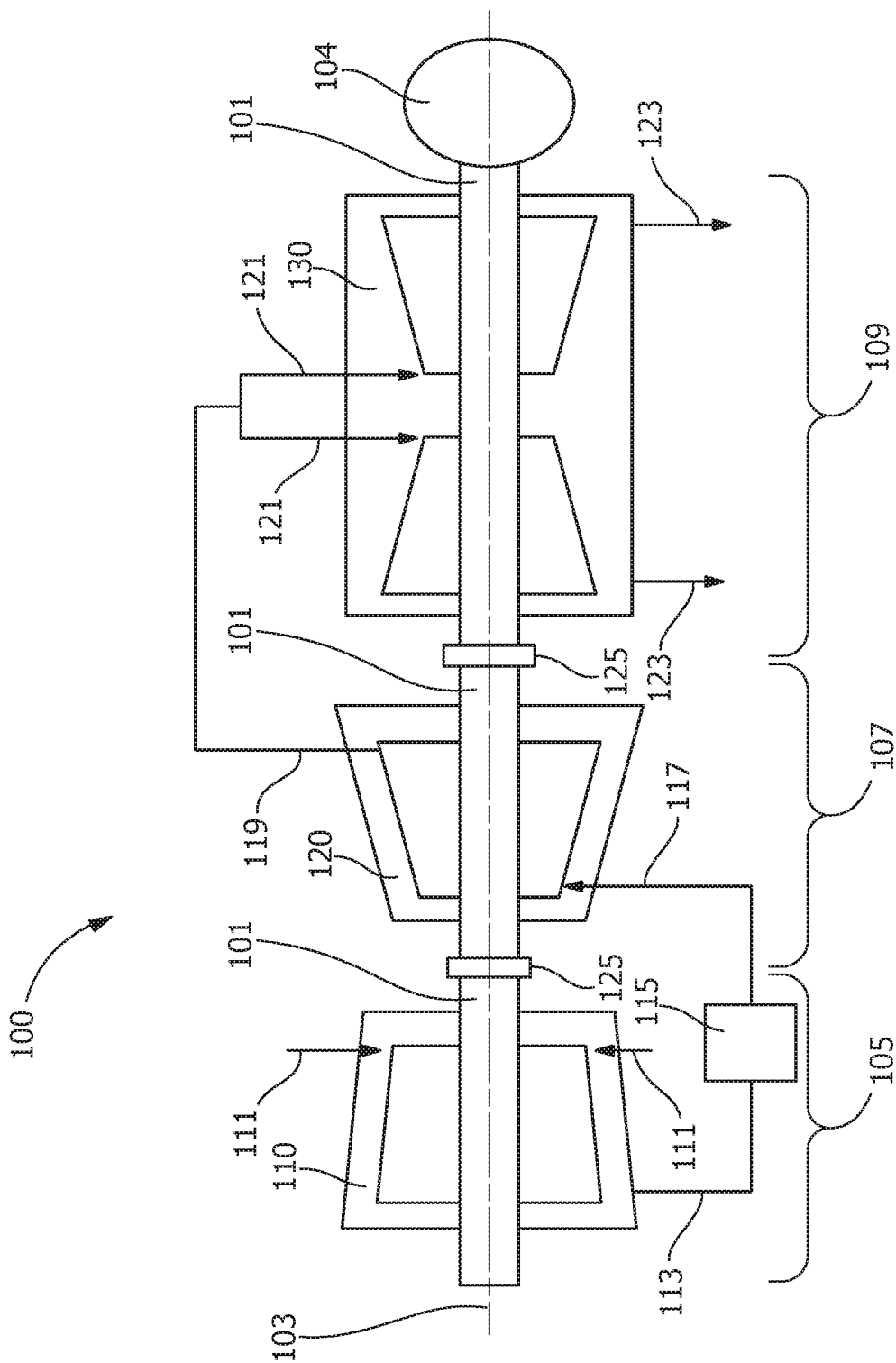
FIG. 1 schematically shows a steam turbine system, according to the present disclosure.

Provided is at least one hydrophilic surface pattern directing surface moisture in at least one predetermined direction in a steam turbine. In some embodiments, the hydrophilic surface pattern is a laser etched nano-scale pattern creating a hydrophilic surface. In some embodiments, the hydrophilic surface pattern creates a superhydrophilic surface. Embodiments of the present disclosure, for example, in comparison to concepts failing to include one or more of the features disclosed herein, enable enhanced moisture management by enhancing moisture removal, reducing erosion caused by moisture in a steam turbine, especially in the low pressure section, or combinations thereof.

Control of erosion in margin stage turbine buckets is desirable and often necessary. As turbine designs evolve, designers are often faced with the presence of greater amounts of moisture and the presence of new materials, some of which are difficult to protect with conventional shielding. Effectively removing moisture and controlling droplet sizes and locations improves margin bucket life and turbine aerodynamic efficiency. Turbine efficiency is positively impacted by reduced moisture and reduced erosion, as the originally-designed airfoil shape is maintained for a longer period of time. Greater efficiency in moisture removal is achieved by the use of the hydrophilic surface patterns over existing technology utilizing only slits or holes or coatings.

The use of the hydrophilic surface patterns also permits optimization of the number, size, and/or location of extraction openings needed by directing the moisture more efficiently towards them. The optimization preferably minimizes the number and size of the extraction openings. Minimizing the size and number of extraction openings further improves the efficiency of turbine performance through the avoidance of higher vacuum levels inside the nozzles. Reducing the vacuum reduces the volume of steam pulled into the nozzles, leaving more steam available downstream to provide more power. In some embodiments, the hydrophilic surface patterns are hydrophilic or superhydrophilic laser-etched nano-scale patterns.

A greater volume of moisture is removed from the flow stream, because the frequency of droplets escaping the extraction openings is reduced. Reducing the number of slits or holes reduces manufacturing costs. Since the number of stress risers in the nozzles, caused by the inclusion of extraction openings, may be reduced with fewer slits/holes, less expensive materials may be used for nozzle manufacture.

In a diaphragm nozzle-based extraction system, a hydrophilic surface pattern is positioned strategically in front of an extraction opening, which serves as an extraction point, to enable enhanced attraction of the condensed moisture from a greater surface area towards the extraction point. In some embodiments, the extraction opening is a hole or a slit. This improves the volume of water that is extracted and may be used to reduce the number and size of holes or slits needed to accomplish effective reduction of erosion. The centrifugal force from the rotating rotor and buckets causes moisture deposited on the buckets to move away from the rotor and be deposited on the upper portion of the nozzles or on the casing. The hydrophilic surface pattern and extraction opening are preferably located to collect moisture away from the upper 40% of the length of the nozzle. The hydrophilic surface pattern and extraction opening are more preferably located to collect moisture away from the upper 30% of the length of the nozzle. A reduced pressure or suction applied from within the casing to the interior cavity of the nozzle removes moisture from the nozzle interior cavity collected through the extraction opening.

In some embodiments, a hydrophilic surface pattern is positioned on a bucket to direct water downward toward the rotor and away from the casing. The centrifugal force from the rotating rotor and buckets causes moisture deposited on the buckets to move away from the rotor and toward the casing, and the hydrophilic surface pattern on the bucket serves to oppose some of that moisture movement. The hydrophilic surface pattern is preferably located to direct moisture toward the rotor from the area of the upper 40% of the length of the bucket. The hydrophilic surface pattern is more preferably located to direct moisture toward the rotor from the area of the upper 30% of the length of the bucket. The hydrophilic surface pattern may include a series of narrow patterns that also reduce the size of the droplets coming off the bucket by preventing coalescence of smaller droplets into larger droplets that cause greater erosion by impact with downstream surfaces.

In some embodiments, a hydrophilic surface pattern is positioned on the nozzle or the casing surface near a drain in the casing to enable enhanced attraction of the condensed moisture from a greater surface area towards the drain.

Each of the above-mentioned locations for a hydrophilic surface pattern may be used alone or in combination with any of the others.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Systems used to generate power include, but are not limited to, steam turbines, gas turbines, and other turbine assemblies, such as steam turbines or land based aeroderivatives used for power generation. In certain applications, the power generation systems, including the turbomachinery therein (e.g., turbines, compressors, and pumps) and other machinery, may include articles that are exposed to heavy wear conditions. For example, the rotating articles may include certain power generation system components, such as steam turbine rotors or wheels or gas turbine rotors or wheels, and may operate in high heat and high revolution environments.

FIG. 1 schematically shows an example of a steam turbine system 100, according to the present disclosure. The steam turbine system 100 includes a turbine rotor 101 that is mounted rotatably about an axis of rotation 103. The steam turbine system 100 includes a high pressure (HP) section 105, an intermediate pressure (IP) section 107, and a low pressure (LP) section 109, each mounted on the rotor 101. While FIG. 1 shows one arrangement of the HP section 105, the IP section 107, and the LP section 109, the present disclosure is not so limited; any suitable arrangement of the HP section 105, the IP section 107, and/or the LP section 109 may be utilized. Each of the HP section 105, the IP section 107, and the LP section 109 includes blades or buckets 131 (see FIG. 2) that are circumferentially mounted on the rotor 101 in HP, IP, and LP casings 110, 120, 130 in each of the HP section 105, the IP section 107, and the LP section 109, respectively. The buckets 131 are driven by steam fed to the respective section, where the rotation of the buckets 131 resulting from the steam generates mechanical work. The mechanical work produced in the turbine system 100 drives an external load 104, such as an electrical generator, via the rotor 101.

As shown in FIG. 1, high pressure steam is fed via high pressure steam inlets 111. The steam is exhausted from the HP section 105 at a high pressure steam outlet 113 and fed to a reheater 115, in which heat is added to the steam. From the reheater 115, the steam is fed to the IP section 107 via an intermediate pressure steam inlet 117. The steam is exhausted from the IP section 107 at an intermediate pressure steam outlet 119 and fed to the LP section 109 via a low pressure steam inlet 121. The steam is then exhausted from the LP section 109 via low pressure outlets 123.

Each of the HP section 105, the IP section 107, and the LP section 109 are connected along the rotor 101 via couplings 125. The couplings 125 may be mechanical couplings, such as bolted joints, or may be welded joints. In one embodiment, the couplings 125 permit detachment of any of the HP section 105, the IP section 107, and/or the LP section 109 for reconfiguration, service, or maintenance.

Figure 2:
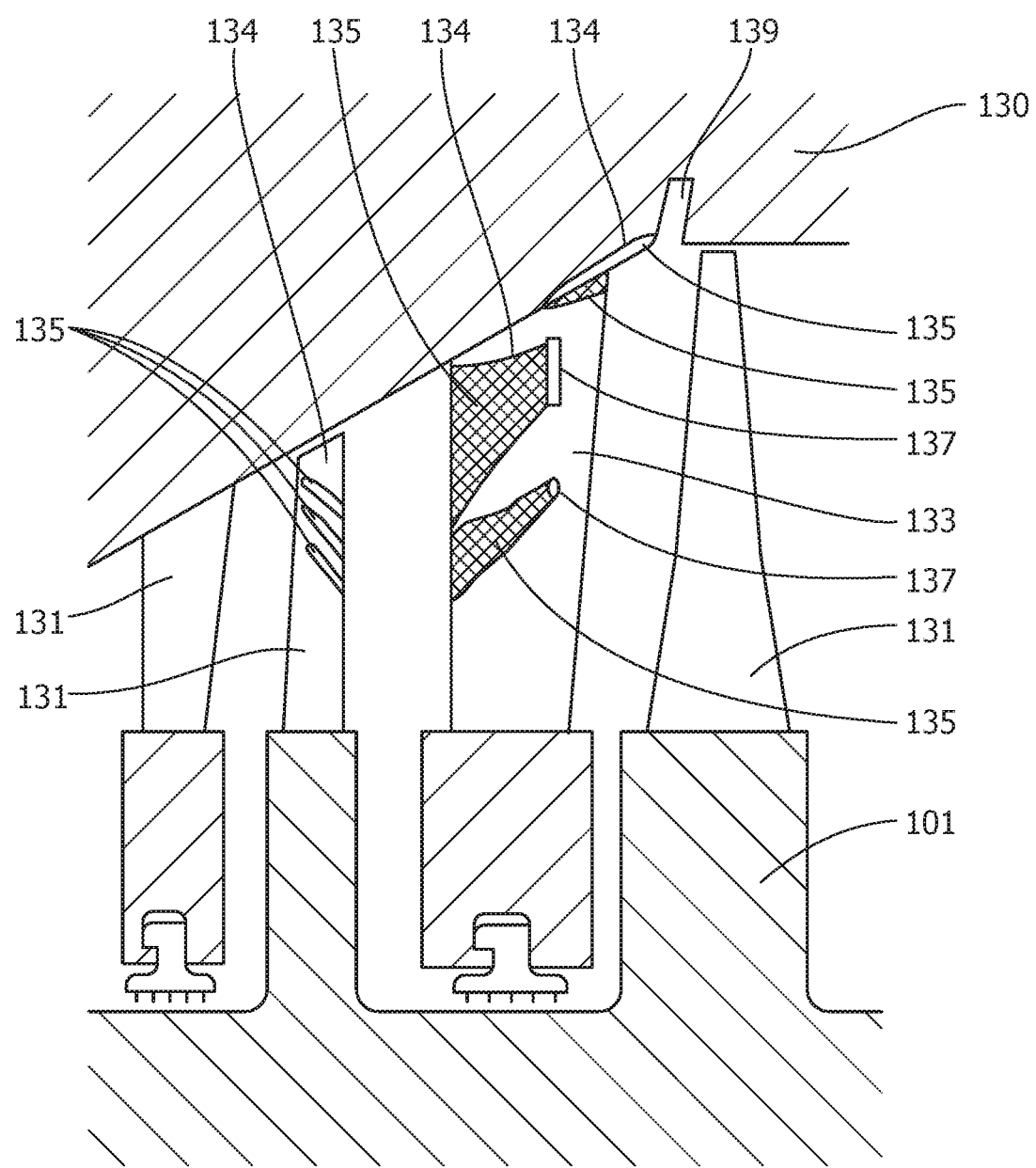
FIG. 2 schematically shows a portion of the low pressure section of the steam turbine of FIG. 1 with hydrophilic surface patterns, according to the present disclosure.

Referring to FIG. 2, the LP section 109 includes the turbine rotor 101 implanted circumferentially with buckets 131 and the casing 130 supporting nozzles 133. The buckets 131 and the nozzles 133 are arranged in stages in the axial direction of the turbine rotor 101. Generally, the buckets 131, casing 130, and nozzles 133 are constructed from materials including suitable known turbine bucket, casing, and nozzle materials, including, but not limited to, steel, stainless steel, precipitation-hardened stainless steel, aluminum, titanium, alloys thereof, or combinations thereof. The LP section 109 includes at least one removal surface 134 having an area with a hydrophilic surface pattern 135 directing surface moisture in at least one predetermined direction. The hydrophilic surface patterns 135 on the bucket 131 direct surface moisture toward the rotor 101 and away from the casing 130. Hydrophilic surface patterns 135 on the nozzle 133 are located upstream of and direct surface moisture toward the extraction openings 137 in the nozzle 133. The centrifugal force causes moisture deposited on the bucket 131 to flow away from the rotor 101 before coming off the bucket 131 in droplets and to gather on the upper portions of the nozzle 133 and the wall surface of the casing 130. Hydrophilic surface patterns 135 on the surface of the nozzle 133 and the casing 130 direct moisture toward a drain 139 in the casing 130.

In some embodiments, the steam turbine system 100 is part of a power-generation system with a wet steam having a moisture content of about 10% flowing near the final stage of the low-pressure turbine because the steam temperature has decreased.

In other embodiments, the steam turbine system 100 is part of a nuclear power plant and has a high-pressure turbine section 105 operating with wet steam because saturated steam is initially supplied. In such embodiments, the hydrophilic surface pattern 135 may be located in any stage of the steam turbine system 100 for enhanced moisture management.

A hydrophilic surface, as used herein, is a surface having a water contact angle less than 90 degrees. The water contact angle is the angle, as measured through the water, where the water/air interface of a drop of water meets the solid surface. In some embodiments, the water contact angle of the hydrophilic surface is less than 45 degrees, alternatively less than 30 degrees, alternatively less than 20 degrees, alternatively less than 10 degrees, or any suitable combination, sub-combination, range, or sub-range thereof. A superhydrophilic surface, as used herein, is a surface having a water contact angle less than 10 degrees. In some embodiments, the water contact angle of the superhydrophilic surface is less than 5 degrees.

A hydrophilic surface pattern 135, as used herein, is any surface pattern formed in the surface of a material that changes the topography of the surface, rather than coating the surface, to increase the hydrophilicity of the surface such that the surface with the hydrophilic surface pattern 135 is hydrophilic. The changes to the topography may include, but are not limited to, indentations, protrusions, cavities, grooves, ridges, spheres, or rods. In some embodiments, the topography change is a micro-scale change. In some embodiments, the topography change is a nano-scale change. Any method capable of producing a hydrophilic surface pattern 135 may be applied to change the topography of the surface within the spirit of the present invention. In some embodiments, the surface with the hydrophilic surface pattern 135 is superhydrophilic.

In some embodiments, the removal surface 134 is processed by a finishing technique prior to the laser etching. The finishing technique preferably provides the removal surface 134 with any surface texture, up to a mirror-like surface, that improves the receptiveness of the removal surface 134 to receive a hydrophilic surface pattern by laser etching. This preparation may include, but is not limited to, grinding, sanding, polishing, honing, electro-polishing, chemical milling, drag finishing, or any combination thereof. The processing may only be selectively needed depending on the size and depth of the hydrophilic surface pattern 135 employed.

In some embodiments, the hydrophilic surface pattern 135 is formed by any method capable of laser-etching a pattern on the nozzle 133, bucket 131, or casing 130 to make the removal surface 134 hydrophilic or more hydrophilic than without the hydrophilic surface pattern 135. In some embodiments, the hydrophilic surface pattern 135 makes the surface superhydrophilic. In some embodiments, the laser used to laser etch the pattern is a femtosecond laser, also known as a femto laser. In some embodiments, the femtosecond laser forms a three-dimensional pattern by laser etching the removal surface with high-energy femtosecond-long laser pulses. The laser-etched pattern may have a patterning in the micrometer to nanometer size range.

In some embodiments, the laser etching creates one or more indentations in the removal surface 134 of the material that have a micro-rough surface of protrusions, cavities, spheres, rods, or other regularly or irregularly shaped features that increases the hydrophilicity of the surface. In some embodiments, the features have dimensions in the range of 0.5 to 100 microns, alternatively in the range of 25 to 75 microns, alternatively in the range of 40 to 60 microns, or any suitable combination, sub-combination, range, or sub-range thereof. In other embodiments, the laser etching creates one or more indentations in the removal surface 134 of the material that have a nano-rough surface of protrusions, cavities, spheres, rods, or other irregularly shaped features that increases the hydrophilicity of the removal surface 134. In some embodiments, the features have dimensions in the range of 1 to 500 nanometers, alternatively in the range of 100 to 400 nanometers, alternatively in the range of 200 to 300 nanometers, or any suitable combination, sub-combination, range, or sub-range thereof.

In some embodiments, laser etching is accomplished by direct laser ablation, interferometric laser ablation, near-field laser ablation, mask-projection ablation, laser-assisted chemical etching, deposition from a laser ablation plume, or plasmonic nanoablation. In some embodiments, the laser etching is accomplished using femtosecond duration laser pulses. A femtosecond duration laser pulse, as used herein, is any laser pulse having a duration in the range of 1 to 999 femtoseconds. In some embodiments, the laser pulse has a duration in the range of 100 to 750 femtoseconds. In some embodiments, the laser pulse has a duration in the range of 400 to 600 femtoseconds.

The hydrophilic surface pattern 135 created by the laser etching may be any regular or irregular pattern that makes the removal surface 134 hydrophilic or more hydrophilic. In some embodiments, the hydrophilic surface pattern 135 created by the laser etching makes the removal surface 134 superhydrophilic. In some embodiments, the hydrophilic surface pattern 135 directs moisture flow in a predetermined direction along the removal surface 134. In some embodiments, the hydrophilic surface pattern 135 directs the moisture flow in a predetermined direction as a result of the orientation of the specific patterning of the hydrophilic surface pattern 135. In some embodiments, the hydrophilic surface pattern 135 directs the moisture flow in a predetermined direction as a result of shape and orientation of the patterned area, as the moisture tends to remain within the patterned area of the surface based on the hydrophilicity, while flowing based on movement of the component having the hydrophilic surface pattern 135 or fluid flow over the surface during operation of the steam turbine.

In some embodiments, one or more hydrophilic surface zones are created on the diaphragm nozzle 133 such that the condensing moisture is attracted from a larger surface area of the nozzle 133 and is directed toward one or more extraction openings 137 provided to extract an increased volume of the liquid. In some embodiments, these zones reduce the number of costly extraction openings 137, in the form of machined holes or slits, required to remove a predetermined amount of moisture, thereby reducing local stress risers in the nozzles caused by the machined holes or slits as well as the buckets, by reducing erosion, and enabling use of thinner wall sections or alternate materials.

Figure 3:
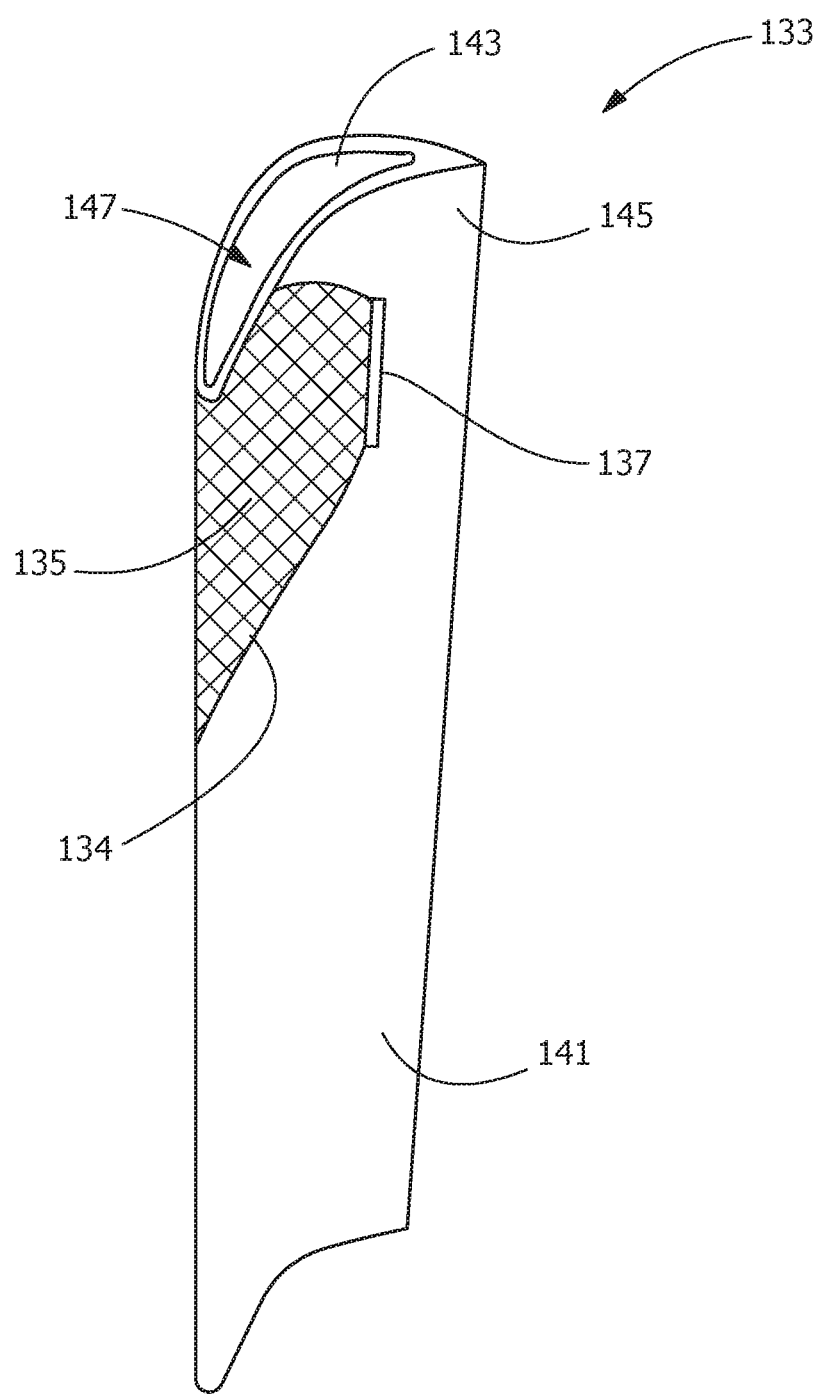
FIG. 3 schematically shows a sectional view of a nozzle with an extraction opening and a hydrophilic surface pattern, according to the present disclosure.

Referring to FIG. 3, the nozzle 133 includes a nozzle wall 141 having an inner surface 143, an outer surface 145, an extraction opening 137 through the nozzle wall 141 from the outer surface 145 to the inner surface 143, and a hydrophilic surface pattern 135 on a removal surface 134 on the outer surface 145 of the nozzle wall 141 adjacent the extraction opening 137. The hydrophilic surface pattern 135 is located upstream of and draws surface moisture toward and into the extraction opening 137. The drawn moisture then flows into the interior cavity 147 defined by the inner surface 143 of the nozzle wall 141. The nozzle wall 141 generally has an asymmetric shape, with the front-facing outer surface of FIG. 3 being slightly concave in shape and the back-facing outer surface, not visible in FIG. 3, being slightly convex in shape. Although the hydrophilic surface pattern 135 and the extraction opening 137 are shown on the concave side in FIG. 3, a hydrophilic surface pattern and an extraction opening may alternatively or additionally be located on the convex side.

Figure 4:
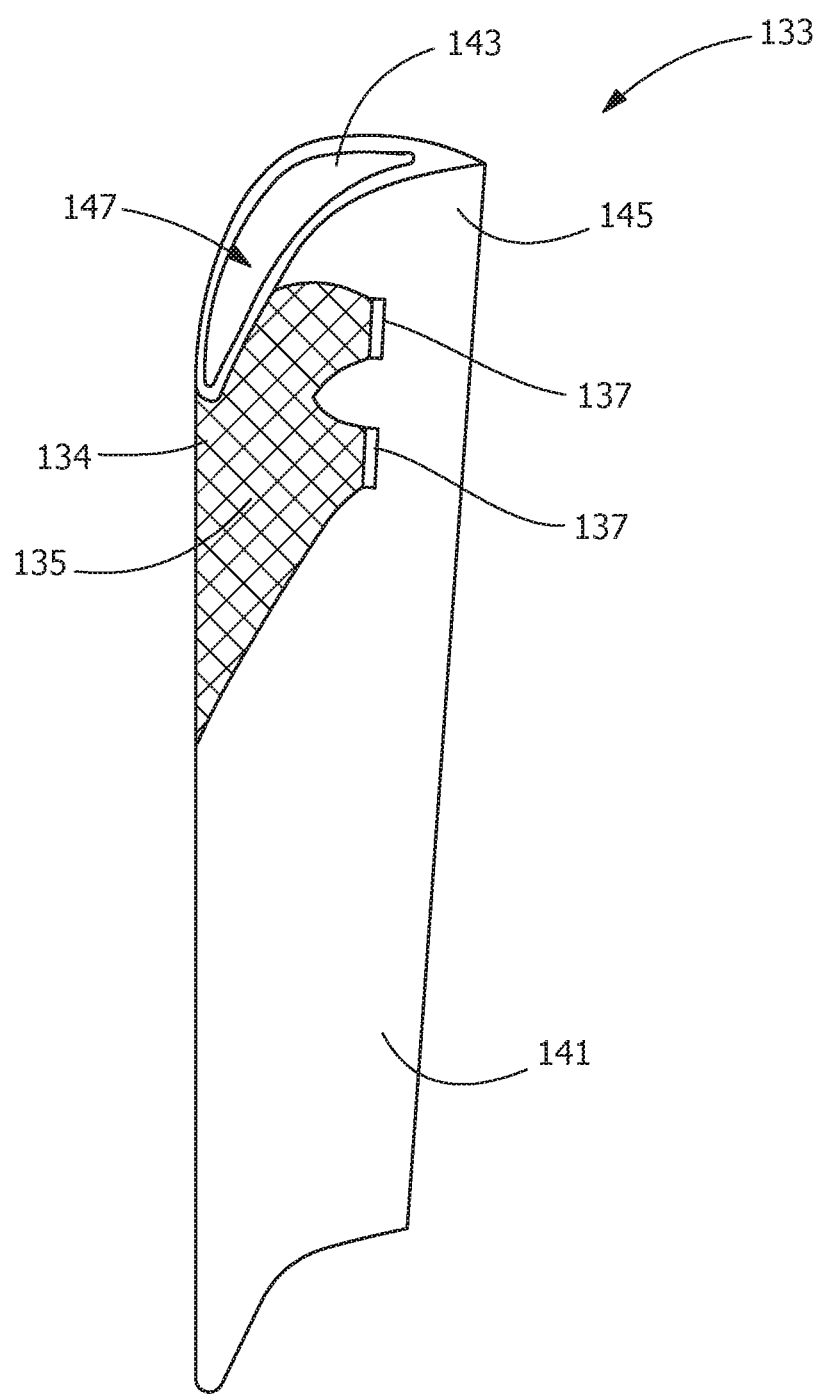
FIG. 4 schematically shows a sectional view of a nozzle with extraction openings and a hydrophilic surface pattern, according to the present disclosure.

Referring to FIG. 4, the nozzle 133 includes a pair of extraction openings 137 through the nozzle wall 141 from the outer surface 145 to the inner surface 143 and a hydrophilic surface pattern 135 on a removal surface 134 on the outer surface 145 of the nozzle wall 141 adjacent the extraction openings 137. The hydrophilic surface pattern 135 is located upstream of and draws surface moisture toward and into the extraction openings 137. The drawn moisture then flows into the interior cavity 147 defined by the inner surface 143 of the nozzle wall 141. Although the hydrophilic surface pattern 135 and the extraction openings 137 are shown on the concave side in FIG. 4, a hydrophilic surface pattern and an extraction opening may alternatively or additionally be located on the convex side.

Figure 5:
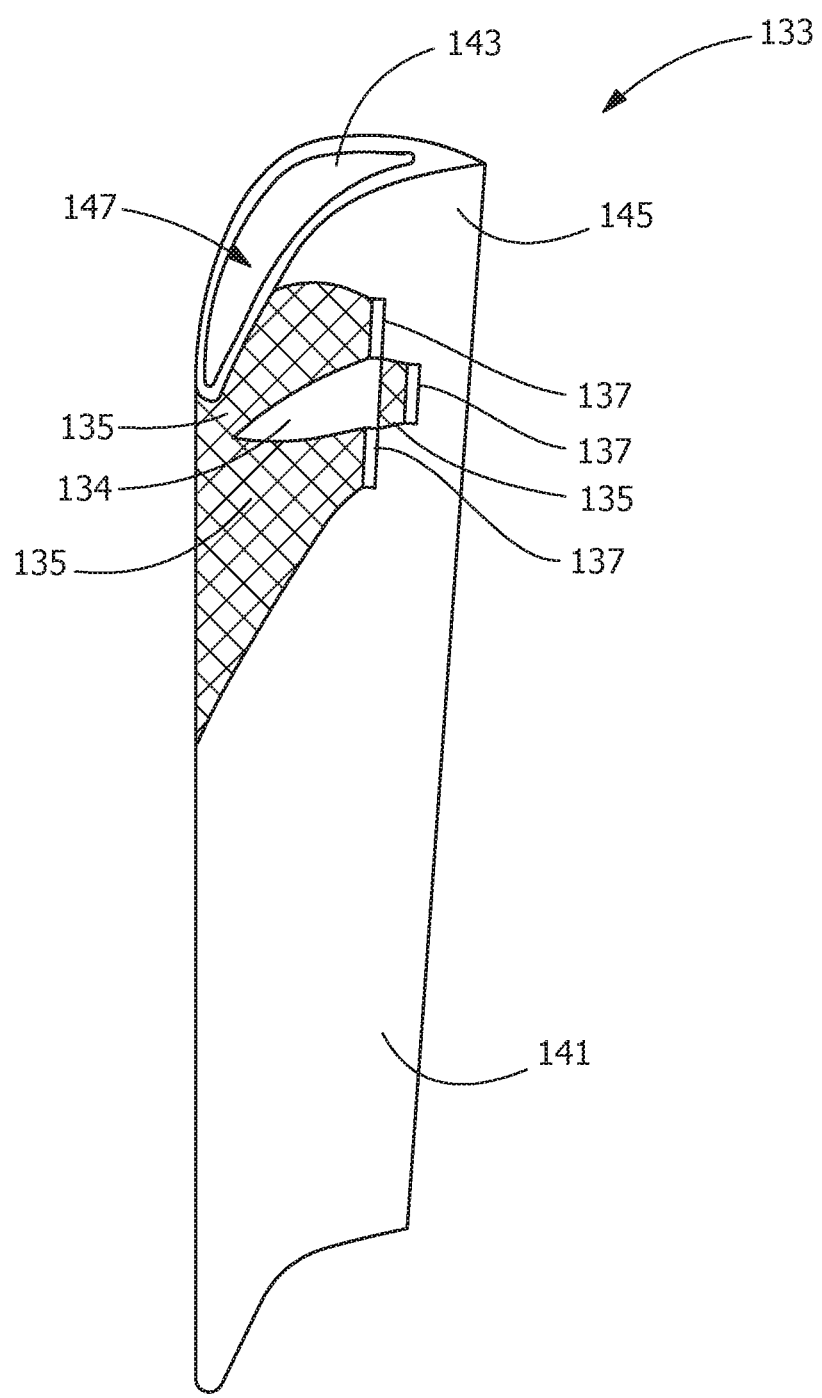
FIG. 5 schematically shows a sectional view of a nozzle with extraction openings and hydrophilic surface patterns, according to the present disclosure.

Referring to FIG. 5, the nozzle 133 includes three extraction openings 137 through the nozzle wall 141 from the outer surface 145 to the inner surface 143 and hydrophilic surface patterns 135 on a removal surface 134 on the outer surface 145 of the nozzle wall 141 adjacent the extraction openings 137. The hydrophilic surface patterns 135 are located upstream of and draw surface moisture toward and into the extraction openings 137. The drawn moisture then flows into the interior cavity 147 defined by the inner surface 143 of the nozzle wall 141. Although the hydrophilic surface patterns 135 and the extraction openings 137 are shown on the concave side in FIG. 5, a hydrophilic surface pattern and an extraction opening may alternatively or additionally be located on the convex side.

Although a specific size, shape, and location of the drain 139 in FIG. 2 and specific sizes, shapes, numbers, and locations of extraction openings and specific sizes, shapes, numbers, and locations of hydrophilic surface patterns 135 are shown in FIG. 2 through FIG. 5, any suitable size, shape, number, or location of drains 139, extraction openings 137, and hydrophilic surface patterns 135 may be used to achieve a predetermined management of moisture. In some embodiments, the hydrophilic surface pattern 135 covers only a small area just in front of the extraction opening 137 to direct surface moisture near the extraction opening 137 into the extraction opening 137. In such embodiments, the hydrophilic surface pattern 135 covers only an area about equal in size to the area of the extraction opening 137, alternatively about twice the area, alternatively about three times the area, alternatively about four times the area, alternatively about five times the area, alternatively about twice to about five times the area of the extraction opening 137, or any suitable combination, sub-combination, range, or sub-range thereof.

In some embodiments, a method of forming a steam turbine 100 for enhanced moisture management includes laser etching at least one hydrophilic surface pattern 135 on a removal surface 134 of at least one of a turbine casing 130, at least one bucket 131, and at least one nozzle 133 of the steam turbine 100 to direct moisture on the removal surface 134 in a predetermined direction to enhance moisture management in the steam turbine 100. The steam turbine 100 includes the turbine casing 110, a turbine rotor 101 disposed in the turbine casing 110, the bucket 131 extending from the turbine rotor 101, and the nozzle 133 supported by the turbine casing 110. In some embodiments, the method includes forming a nozzle wall 141 of the nozzle 133 having an inner surface 143 and an outer surface 145 and forming at least one extraction opening 137 through the nozzle wall 141 from the outer surface 145 to the inner surface 143, where the removal surface 134 is located on the outer surface 145 of the nozzle wall 141 adjacent the extraction opening 137. The hydrophilic surface pattern 135 is preferably on an upstream side of the nozzle wall 141 adjacent the extraction opening 137. The laser etching preferably includes etching the outer surface with high-energy femtosecond-long laser pulses with patterning in a 1 to 500 nanometer size range.

In some embodiments, a component in service may be removed from service and a hydrophilic surface pattern 135 may be applied to a surface of the component. Such components may include those that previously had a removal surface 134 with a hydrophilic surface pattern 135 or those that did not previously have a removal surface 134 with a hydrophilic surface pattern 135. In some situations, a removal surface 134 may lose its hydrophilicity over time during operation of a steam turbine 100 for reasons that may include, but are not limited to, damage to the hydrophilic surface pattern 135 or deposition of foreign material on the hydrophilic surface pattern 135 during operation of the steam turbine system 100. In some embodiments, the removal surface 134 may be made hydrophilic or more hydrophilic again during service of the component by cleaning the removal surface 134 having the hydrophilic surface pattern 135 or laser etching a new hydrophilic surface pattern 135 on the removal surface 134.

Although the invention has been described primarily with respect to a low pressure section of a steam turbine, the invention may be applied to any other system where moisture removal would be beneficial, including, but not limited to, a high pressure section of a steam turbine, an intermediate pressure section of a steam turbine, or a compressor section of a gas turbine.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A steam turbine comprising:
   a turbine casing;
   a turbine rotor disposed in the turbine casing;
   at least one bucket extending from the turbine rotor; and
   at least one nozzle supported by the turbine casing;
   wherein at least one hydrophilic surface pattern of a laser-etched nano-scale pattern on a removal surface of the at least one bucket directs moisture on the removal surface in a predetermined direction toward the rotor and away from the casing to enhance moisture management in the steam turbine; and
   wherein an orientation of a patterning of the at least one hydrophilic surface pattern directs flow of the moisture in the predetermined direction toward the rotor and away from the casing during operation of the steam turbine;
   wherein the hydrophilic surface pattern is located to direct moisture toward the rotor from an area of an upper 30% of a length of the at least one bucket.

2. The steam turbine of claim 1, wherein the at least one hydrophilic surface pattern is a superhydrophilic pattern.

3. The steam turbine of claim 1, wherein the at least one nozzle comprises a nozzle wall having an inner surface, an outer surface, at least one extraction opening through the nozzle wall from the inner surface to the outer surface, a second removal surface located on the outer surface of the nozzle wall adjacent the at least one extraction opening to enhance moisture removal through the extraction opening, and a second hydrophilic surface pattern of a second laser-etched nano-scale pattern on the second removal surface.

4. The steam turbine of claim 3, wherein the second removal surface is located on an upstream side of the nozzle wall adjacent the at least one extraction opening.

5. The steam turbine of claim 3, wherein the second hydrophilic surface pattern directs moisture on the second removal surface toward the at least one extraction opening.

6. The steam turbine of claim 3, wherein the at least one extraction opening is a slit.

7. The steam turbine of claim 1 further comprising a second hydrophilic surface pattern on a second removal surface located on a surface of the turbine casing and directing moisture toward a drain in the turbine casing.

8. A steam turbine bucket comprising:
   at least one hydrophilic surface pattern of a laser-etched nano-scale pattern on a removal surface of the steam turbine bucket configured to direct moisture on the removal surface in a predetermined direction toward a rotor and away from a casing to enhance moisture management in a steam turbine;
   wherein an orientation of a patterning of the at least one hydrophilic surface pattern directs flow of the moisture in the predetermined direction toward rotor and away from the casing during operation of the steam turbine comprising the steam turbine bucket;
   wherein the hydrophilic surface pattern is located to direct moisture toward the rotor from an area of an upper 30% of a length of the steam turbine bucket.

9. The steam turbine bucket of claim 8, wherein the hydrophilic surface pattern is a superhydrophilic pattern.

10. A method of managing moisture in a steam turbine comprising:
    laser etching at least one hydrophilic surface pattern of a laser-etched nano-scale pattern on a removal surface of at least one bucket of the steam turbine configured to direct moisture on the removal surface in a predetermined direction toward a rotor and away from a casing to enhance moisture management in the steam turbine, the steam turbine comprising:
    the casing;
    a turbine rotor disposed in the casing;
    the at least one bucket extending from the rotor; and
    a nozzle supported by the casing;
    wherein an orientation of a patterning of the at least one hydrophilic surface pattern directs flow of the moisture in the predetermined direction toward the rotor and away from the casing during operation of the steam turbine, and
    wherein the at least one hydrophilic surface pattern is located to direct moisture toward the rotor from an area of an upper 30% of a length of the at least one bucket.

11. The method of claim 10, further comprising: forming a nozzle wall of the nozzle having an inner surface and an outer surface; and
    forming at least one extraction opening through the nozzle wall from the outer surface to the inner surface;
    wherein a second removal surface is located on the outer surface of the nozzle wall adjacent the at least one extraction opening.

12. The method of claim 11, wherein the second removal surface is located on an upstream side of the nozzle wall adjacent the at least one extraction opening.

13. The method of claim 10, wherein the at least one hydrophilic surface pattern is a superhydrophilic pattern.

14. The method of claim 10, wherein the steam turbine further comprises: a second removal surface located on a surface of the casing and directing moisture toward a drain in the casing.

15. The method of claim 10, wherein the laser etching comprises laser etching the outer surface with high-energy femtosecond-long laser pulses with patterning in a 1 to 500 nanometer size range.

* * * * *